United States Patent
Alti Barbon et al.

(10) Patent No.: US 9,328,716 B2
(45) Date of Patent: May 3, 2016

(54) DIRECT-DRIVE WIND TURBINE

(75) Inventors: Ignacio Alti Barbon, Zamudio Bizkaia (ES); Mauro Villanueva Monzón, Madrid (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 171 days.

(21) Appl. No.: 14/376,773

(22) PCT Filed: Feb. 17, 2012

(86) PCT No.: PCT/ES2012/000035
§ 371 (c)(1),
(2), (4) Date: Aug. 5, 2014

(87) PCT Pub. No.: WO2013/121054
PCT Pub. Date: Aug. 22, 2013

(65) Prior Publication Data
US 2014/0361547 A1    Dec. 11, 2014

(51) Int. Cl.
*F03D 9/00* (2016.01)
*H02P 9/04* (2006.01)
*F03D 1/06* (2006.01)
*F03D 1/00* (2006.01)

(52) U.S. Cl.
CPC .............. *F03D 1/0658* (2013.01); *F03D 1/003* (2013.01); *F03D 9/002* (2013.01); *F05B 2220/7066* (2013.01); *Y02B 10/30* (2013.01); *Y02E 10/721* (2013.01); *Y02E 10/725* (2013.01); *Y02E 10/726* (2013.01)

(58) Field of Classification Search
CPC . F03D 1/0633; F03D 11/0091; F03D 11/022; F03D 5/30
USPC ................... 290/44, 55; 416/61, 232
See application file for complete search history.

(56) References Cited

U.S. PATENT DOCUMENTS

| | | | | |
|---|---|---|---|---|
| 4,565,929 A | * | 1/1986 | Baskin | F03D 1/0658 174/DIG. 15 |
| 6,467,233 B1 | * | 10/2002 | Maliszewski | E04H 12/085 290/44 |
| 7,982,330 B1 | * | 7/2011 | Ueno | F03D 11/0066 290/44 |
| 2007/0075548 A1 | * | 4/2007 | Bagepalli | F03D 1/003 290/55 |

(Continued)

FOREIGN PATENT DOCUMENTS

| | | |
|---|---|---|
| DE | 44 15 570 A1 | 9/1995 |
| DE | 102009022179 A1 | 11/2010 |

(Continued)

OTHER PUBLICATIONS

English Patent Abstract of Japan 57148073 A.

*Primary Examiner* — Tulsidas C Patel
*Assistant Examiner* — Thomas Quigley
(74) *Attorney, Agent, or Firm* — Ladas & Parry LLP

(57) ABSTRACT

A direct-drive wind turbine comprising an external rotor having an external anular body and a stator, a nacelle which is mounted on an upper part of a tower and which houses a shaft-holder mechanism for supporting the horizontal shaft, a plurality of blade-holder structures arranged equidistantly on external peripheral portions of the external anular body, and a blade root connected to the blade-holder structure, said turbine also including a distal end part connected to the blade root, a lateral hatch for accessing an internal chamber in the blade ender and a door for closing the hatch.

15 Claims, 12 Drawing Sheets

(56) References Cited

U.S. PATENT DOCUMENTS

| | | | |
|---|---|---|---|
| 2008/0272604 A1* | 11/2008 | Versteegh | F03D 1/0666 290/55 |
| 2009/0021019 A1* | 1/2009 | Thomsen | E04H 12/085 290/55 |
| 2010/0098552 A1 | 4/2010 | Aarhus | |
| 2013/0236311 A1* | 9/2013 | Segovia | F03D 1/0691 416/146 R |

FOREIGN PATENT DOCUMENTS

| | | |
|---|---|---|
| EP | 0 864 748 A1 | 9/1998 |
| EP | 1 394 406 A2 | 3/2004 |
| EP | 1 783 363 A1 | 5/2007 |
| JP | 57/148073 A | 9/1982 |
| WO | 01/21956 A1 | 3/2001 |
| WO | 01/42647 A2 | 6/2001 |
| WO | 03/060319 A1 | 7/2003 |

* cited by examiner (A-A)

(B-B)

(C-C)

*(D-D)*

(E-E)

*(F-F)*

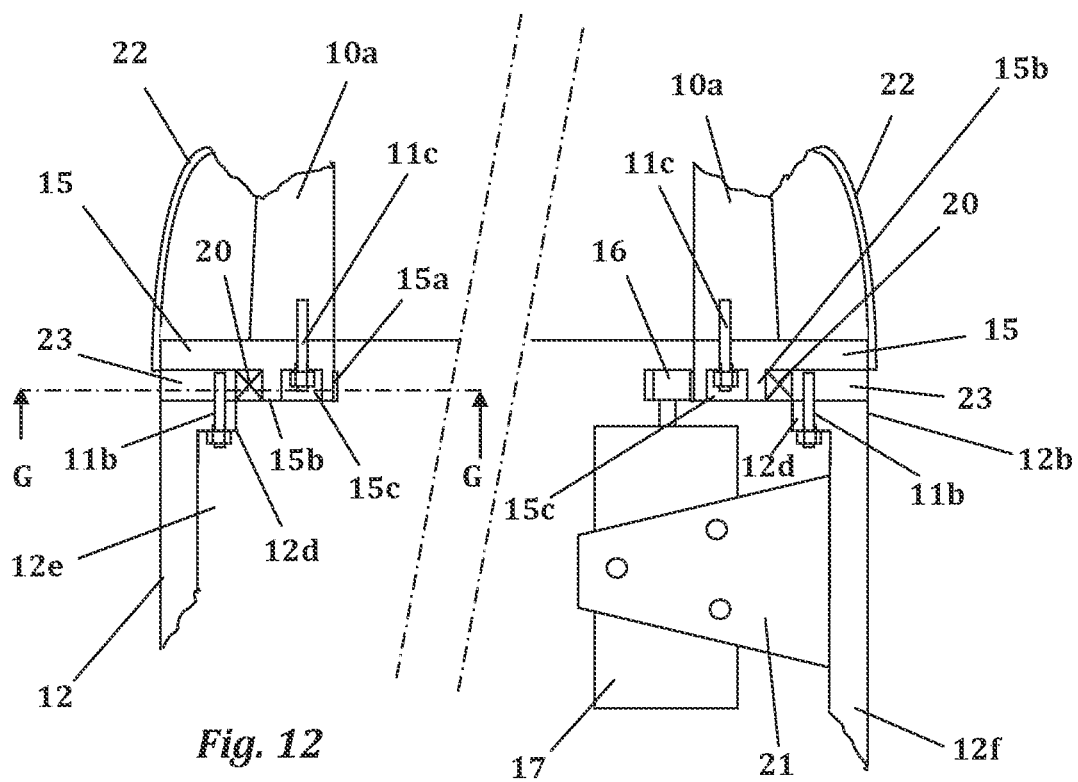
*Fig. 12*
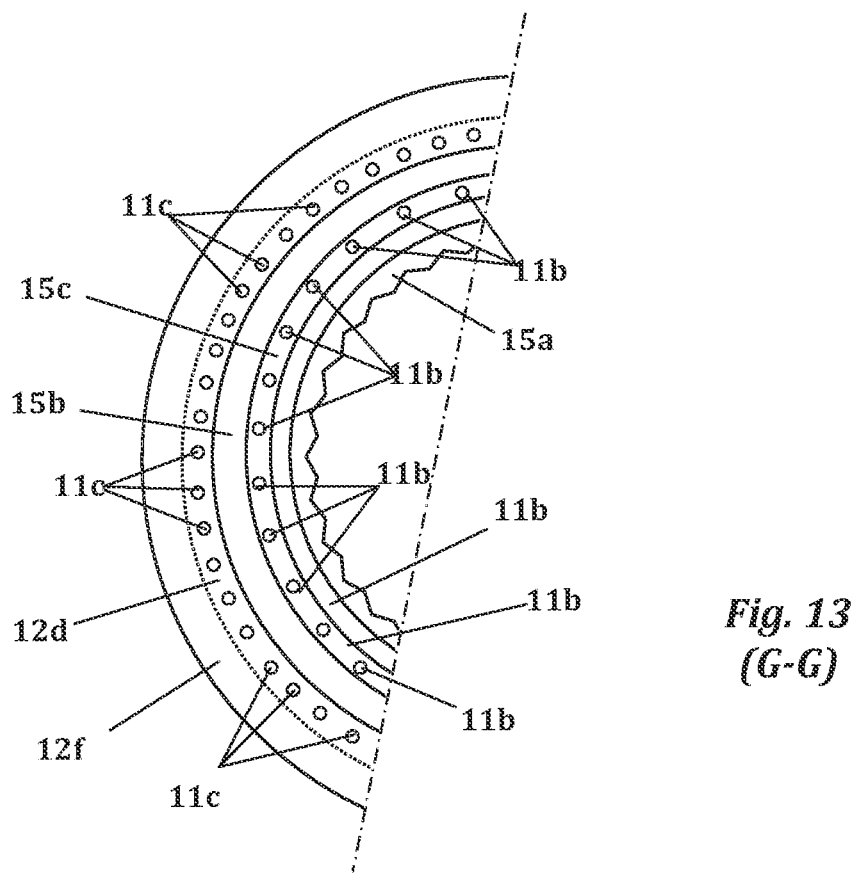
*Fig. 13 (G-G)*

DIRECT-DRIVE WIND TURBINE

RELATED APPLICATION INFORMATION

This application is a 371 of International Application PCT/ES2012/000035 filed 17 Feb. 2012 entitled "Direct-Drive Wind Turbine", which was on 22 Aug. 2013, with International Publication Number WO 2013/121054 A1, the content of which is incorporated herein by reference.

FIELD OF THE INVENTION

The present invention resides in the technical field of horizontal axis wind turbines and, particularly, direct drive wind turbines with a rotor directly connected to the rotor blades that turns around an internal stator.

BACKGROUND OF THE INVENTION

Wind turbines are common in the state of the art and are becoming increasingly more important for generating electrical power on a global scale. The most common wind turbines include horizontal axis wind turbines, in which a rotor hub that bears a plurality of turbine blades is attached to the internal rotor of an electric machine through a horizontal drive shaft and gearbox. The hub is mounted in a gyratory manner onto a nacelle at the top of a tower. The nacelle houses the gearbox, the electric machine and other functional elements. The gearbox, in addition to being fairly expensive, is an element that requires constant maintenance and a great deal of space, hence the dimensions of the nacelle should be sufficiently large enough to house the gearbox.

"Direct drive" wind turbines have been developed to solve this problem. A direct drive wind turbine comprises an external rotor and internal stator, a horizontal shaft connected to the external rotor so that the external rotor turns around the internal stator. It also comprises a nacelle mounted at the top of a tower that houses a shaft, carrier mechanism for bearing the horizontal shaft. The blade roots are connected to the external rotor, generally through a hollow hub. The dimensions of the hub are designed to enable access to some bolts through which the blade root is fastened directly to the hub or, where pertinent, likewise to a pitch angle adjustment mechanism to regulate the blade attack angle. The hub is an additional element that should be connected to the external rotor. The foregoing requires a relatively large unit and entails the need for additional connection elements, which should be mounted and maintained. A direct drive wind turbine of this sort is described, for instance in document WO 01/21956-A1.

Documents EP-0864748-A1, EP1394406A2, EP-1783363-A1 and DE-44155570-A1 also describe direct drive wind turbines that lack a hub with the blades directly coupled to support structures mounted equidistantly on external peripheral parts of the body of an external rotor. The problem inherent in wind turbines of this son involve the bolts employed for fastening the blade or, where pertinent, the pitch mechanism elements, to the blade support structures, since they are not accessible for inspection, maintenance or repair and/or replacement tasks. Thus, when these tasks are necessary, the entire nacelle rotor must be dismounted and lowered to the ground.

DESCRIPTION OF THE INVENTION

The present invention intends to overcome the aforementioned drawbacks in the state of the art by providing a direct drive wind turbine comprising a generator that includes an external rotor with an external annular body and internal stator; a horizontal shaft to which the external rotor is connected so that the external rotor turns around the internal stator, a nacelle mounted on top of the tower for housing a shaft carrier mechanism to bear this horizontal shaft; and a plurality of blade carrier structures evenly arranged on the outer peripheral parts of the external rotor body, with each detachable support structure coupled to a blade root of a turbine; where:

each blade root is connected to the blade carrier structure on the rotor body-through a hollow blade root extender;

the blade root extender comprises a proximal end part connected to the blade carrier structure through proximal bolts, and a distal end part connected to the blade root, an inner chamber encompassed by a peripheral wall, a lateral manhole on the peripheral wall for gaining access to the inner chamber and a door to close the manhole.

The terms "proximal" and "distal" employed herein mean "near the external rotor" and "far from the external rotor".

An extender installed between the blade root, external annular body and the side manhole will enable access to the proximal and distal bolts for inspection, maintenance, repair, tightening and/or replacement tasks in a wind turbine that is not equipped with an additional hub, rather the blades are connected to the same external annular body of the external rotor. These tasks can be executed inside the root extender's inner chamber, which provides additional safety for workers undertaking these tasks.

The direct drive wind turbine could be a conventional model in which the generator rotor comprises a plurality of permanent magnets attached internally to its external annular body and an internal stator comprising inductor windings, though it could also be a model that is electrically excited through superconductors.

Depending on the embodiment of the invention, the distal end part of the root extender is securely connected to the blade root, for instance, through distal axial bolts extending through a flange inside the root extender and penetrating into a peripheral wall of the blade root.

According to such an embodiment, each blade carrier structure could comprise a pitch system to rotate the blade consisting of a gyratory ring element that is mounted on the proximal end part of the root extender, and at least one propeller pinion driven by an electric gear motor, and engages the annular notched part of a ring element so that the root extender and, consequently, the blade turn together with the gyratory ring element. The gyratory ring element turns around a central part of the blade support structure.

The notched part could be a constituent of the outer peripheral edge of the gyratory ring element arranged underneath the proximal end part of the root extender, and could be driven by an electric gear motor attached to the external rotor body outside the root extender.

Alternatively, the notched part could be a constituent of the inner annular notched edge part of the gyratory ring element while the electric gear motor is mounted in a stationary manner at the central part of the root support structure. The proximal end part of the root extender encompasses this notched edge part, propeller pinion and electric gear motor, and turns with the gyratory ring element when the latter rotates on the blade support structure. In this case, the electric gear motor can be mounted in a stationary manner onto the central part of the blade carrier structure through a motor support so that the electric gear motor is arranged within the inner chamber of the root extender, or at least partially mounted at a gap on this central part of the blade support structure.

In another embodiment of the invention, the proximal end part of the root extender could be connected to the gyratory ring element through proximal bolts extending through an internal proximal flange on the root extender into the gyratory-ring element.

According to this alternative embodiment, each blade carrier structure could comprise a blade pitch angle adjustment mechanism to rotate the blade, consisting of a stationary ring element that is mounted on the blade support structure, and at least one propeller pinion that engages an annular notched part of the stationary ring element, and driven by an electric gear motor. The proximal end part of the root extender is mounted on a part of the support that is mounted in a gyratory manner onto blade support structure. The notched part is an inner peripheral part of the ring element located underneath the proximal edge part of the root extender. Each electric gear motor is mounted in a stationary manner on the blade carrier structure onto an inner part of the wall inside the inner chamber of the root extender. The rotation of the propeller pinion causes the electric gear motor to travel along the annular notched part inside the stationary ring element. Given that the electric gear motor is attached to the inner part of the root extender wall, it forces the root extender to move with the electric gear motor and, consequently, turn with respect of the blade support structure.

In a further embodiment, the proximal end part of the root extender is securely connected to the root support structure.

Depending on this further embodiment, the proximal end part of the extender can be securely connected to the blade carrier structure through a plurality of axial bolts extending through an inner proximal flange inside the root extender into the blade support structure.

An alternative to this further embodiment entails a blade pitch angle adjustment mechanism comprising a gyratory ring element mounted on the distal end part of the root extender. The blade pitch angle adjustment mechanism includes at least one propeller pinion that engages an annular notched part inside the gyratory ring element. The propeller pinion is driven by an electric gear motor mounted in a stationary manner on an inner distal part of the wall inside the inner chamber of the root extender. The blade root is fastened to the gyratory ring element so that the rotation of the propeller pinion causes the gyratory ring element and therefore the blade root secured thereto to rotate, hence the blade.

The present invention clearly enables access through the side manhole for inspecting, repairing and replacing the fastening bolts and other elements from inside the root extender with no need to mount an additional hub onto the external rotor; and therefore satisfactorily overcomes the drawbacks of the current state of the art.

BRIEF DESCRIPTION OF THE FIGURES

The aspects and embodiments of the invention will be described below based on some annexed schematic drawings, in which
FIG. 12 is a partial cross section of a blade carrier structure and root extender according to a sixth embodiment of the invention;
FIG. 13 is a cross section along line G-G marked in FIG. 12.

Figure 1:
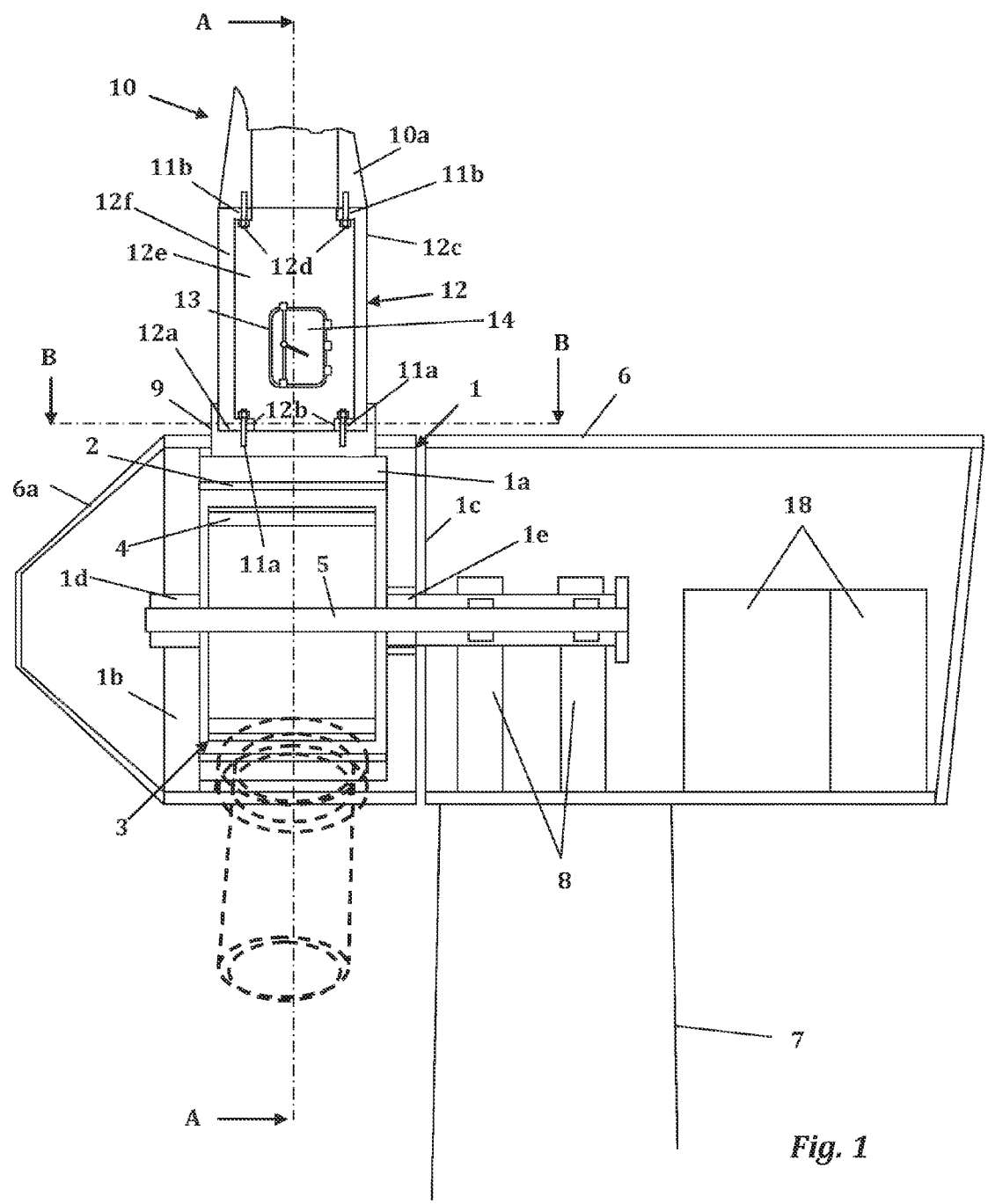
FIG. 1 is a cross section of a first embodiment of a wind turbine according to the invention.

These figures contain numbered references for identifying the following elements
1 external rotor
1a external body ring
1b front shield
1c rear shield
1d front bearing
1e rear bearing
2 permanent magnets
3 internal stator
4 internal coils
5 horizontal axis/shaft
6 nacelle
6a nose
7 tower
8 axis/shaft support mechanism
9 blade support structure
9a central part
9b peripheral support part/area
10 turbine blade
10a blade root
11a proximal axial pins
11b, 11c distal axial pins
12 root extensor
12a proximal extreme part
12b proximal flange
12c distal extreme part
12d distal flange
12e internal chamber
12f peripheral wall
13 lateral entry
14 door
15,15i ring element
15a serrated part
15b connecting part
15c lowered part
16 driving pinion
17 electrical geared motor
18 counterweight
19 proximal bearing
20 distal bearing
21 motor/engine support
22 external fairing
23 ring element support part

EMBODIMENTS OF THE INVENTION

Figure 2:
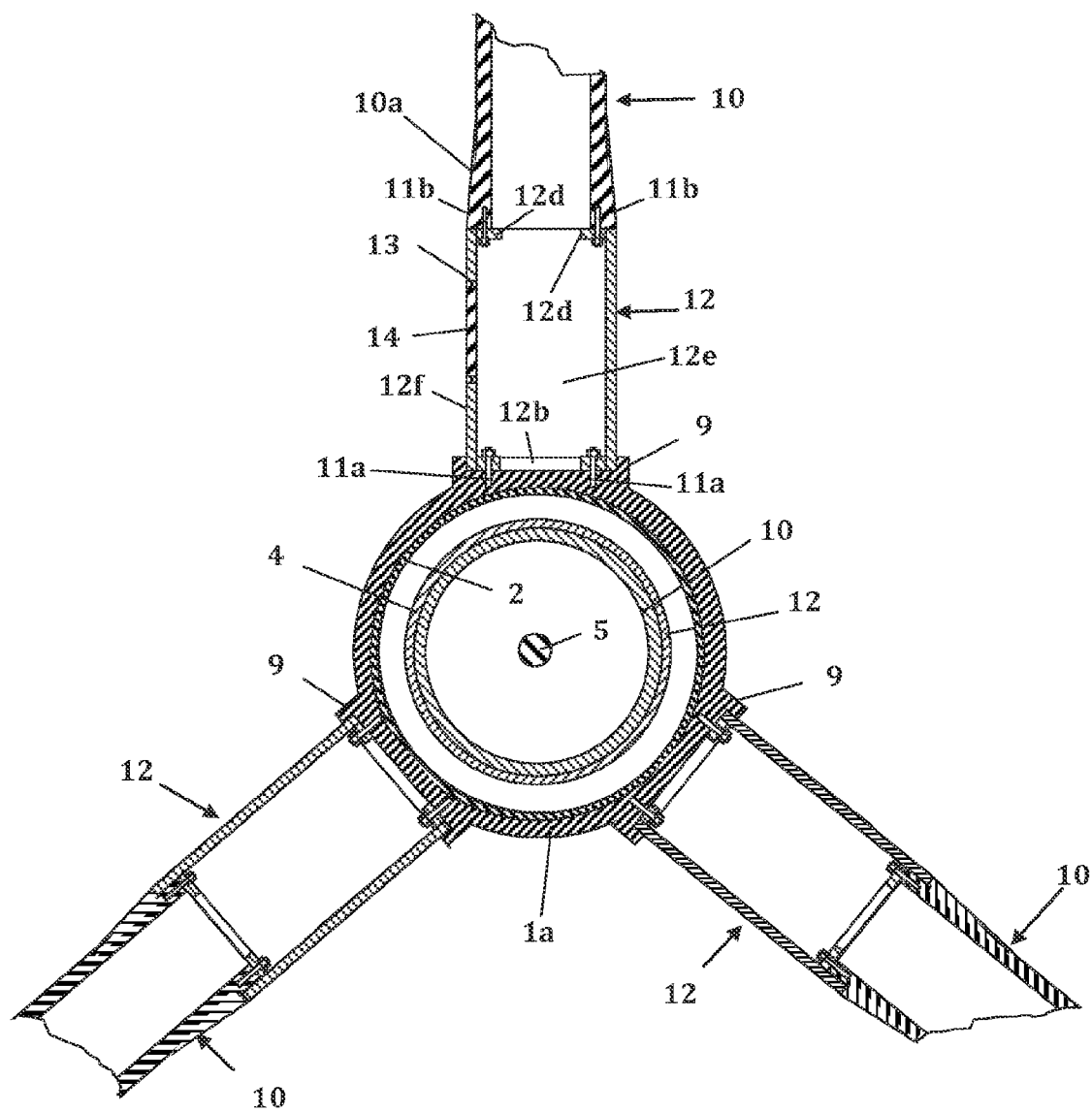
FIG. 2 is a cross section along line A-A marked in FIG. 1.
Figure 3:
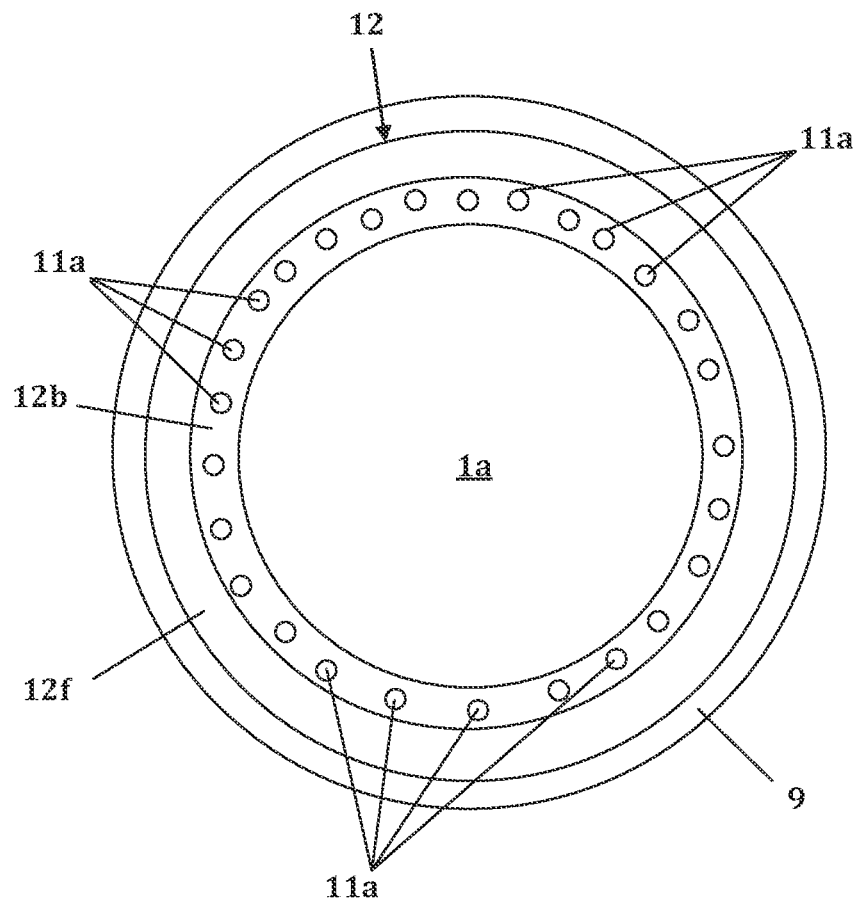
FIG. 3 is a cross section along line B-B marked in FIG. 1.

In the embodiment illustrated in FIGS. 1 through 3, the direct drive wind turbine comprises a nacelle -6- mounted at the top of a tower -7-, an external rotor -1- having an external annular body -1a- with a plurality of permanent magnets -2- fastened inside the external annular body -1a-, and an internal stator -3- comprising inductor windings -4-.

The external rotor -1- comprises a front shield -1b- and a rear shield -1c- connected to a horizontal shaft -5- respectively through a front bearing -1d- and a rear bearing -1e- so that the external rotor -1- can rotate around the internal stator -3-. The horizontal shaft -5- is supported by a conventional shaft carrier mechanism -8- housed in the nacelle. Counterweights -18- are arranged at the rear part of the nacelle. A cone nose -6a- is mounted at the forward part of the external rotor -1-.

The peripheral parts of the external rotor body -1a- of the external rotor -1- are equipped with three evenly distributed blade carrier structures -9- arranged to connect a blade root -10a- of a wind turbine blade -10-. Each blade root -10a- is connected to one of the blade carrier structures -9- on the external annular body -1a- by a hollow blade extender -12- that comprises an inner chamber -12e- encompassed by a peripheral wall -12f-, a proximal end part -12a- securely connected to the blade carrier structure -9- by proximal bolts -11a- and a distal end part -12c- securely connected to the blade root by distal bolts -11b-. The peripheral wall has a side manhole -13- to gain access to the inner chamber -12e-. The manhole -13- is closed by a door -14-.

The proximal end part -12a- of the root extender -12- is securely connected to the blade carrier structure -9- through a plurality of proximal axial bolts -11a- that extend through an internal proximal flange -12b- mounted on the root extender -12- toward the inner part of the blade carrier structure -12-, while the distal end part -12c- of the root extender -12- is securely connected to the blade root -10a- through distal axial bolts -11b, 11c- that extend through an internal distal flange -12d- mounted on the root extender -12- and penetrate a peripheral wall on the blade root -10a-. Thus, the bolts -11a, 11b- can be accessed from the inner chamber -12e- of the root extender -12-.

Figure 4:
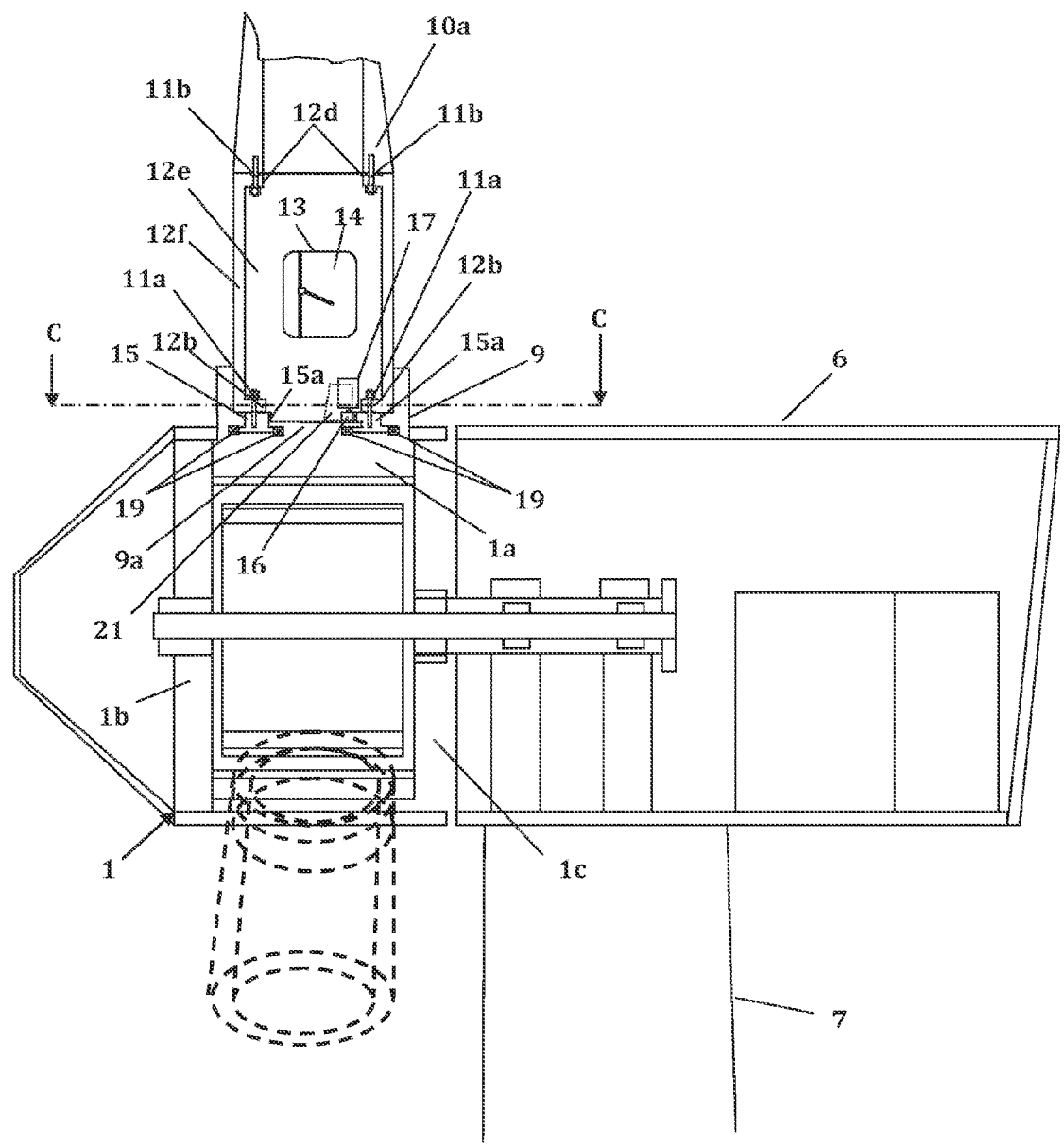
FIG. 4 is a cross section of a second embodiment of the invention.
Figure 5:
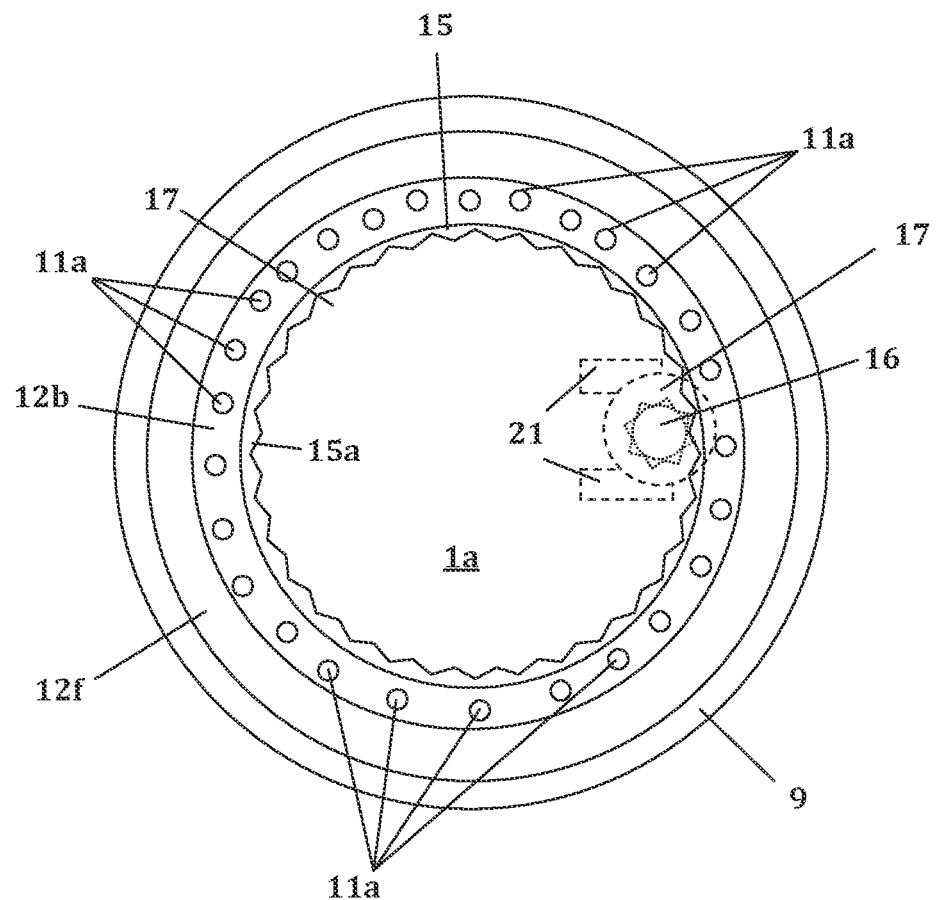
FIG. 5 is a cross section along line C-C marked in FIG. 4.

The second embodiment of the direct drive wind turbine illustrated in FIGS. 4 and 5 differs from the first embodiment illustrated in FIGS. 1 through 3 in that each root extender -12- is connected respectively to one of the blade carrier structures -9- through a pitch angle adjustment mechanism for rotating the blade -10-. The blade pitch angle adjustment mechanism comprises a gyratory ring element -15- mounted in a gyratory manner onto the proximal end part -12a- of the root extender -12- so that the blade -10- rotates with the gyratory ring element -15-, a propeller pinion -16- that engages an annular notched edge part -15a- inside the gyratory ring element -15- and bearings -19 that enable the gyratory ring element -15- to turn on the support structure -9-.

The gyratory pinion -16- is driven by an electric gear motor -17- mounted stationary on a central part -9a- of a blade carrier structure -9- through a motor support -21- so that the root extender -12- and, therefore, the blade -10- rotate with the gyratory ring element -15-.

The proximal end part -12a- of the root extender -12- is mounted on the ring element -15- through proximal bolts -11a- extending through a proximal flange -12b- on the root extender -12-, so that the proximal end part -12a- of the root extender -12- encompasses the notched edge part -15a-, the propeller pinion -16- and the electric gear motor -17-. Thus, the proximal bolts -11a-, distal bolts -11b-, the notched edge part -15a-, propeller pinion -16- and the electric gear motor -17- are housed and accessible from the inner chamber -12e- of the root extender -12-.

Figure 6:
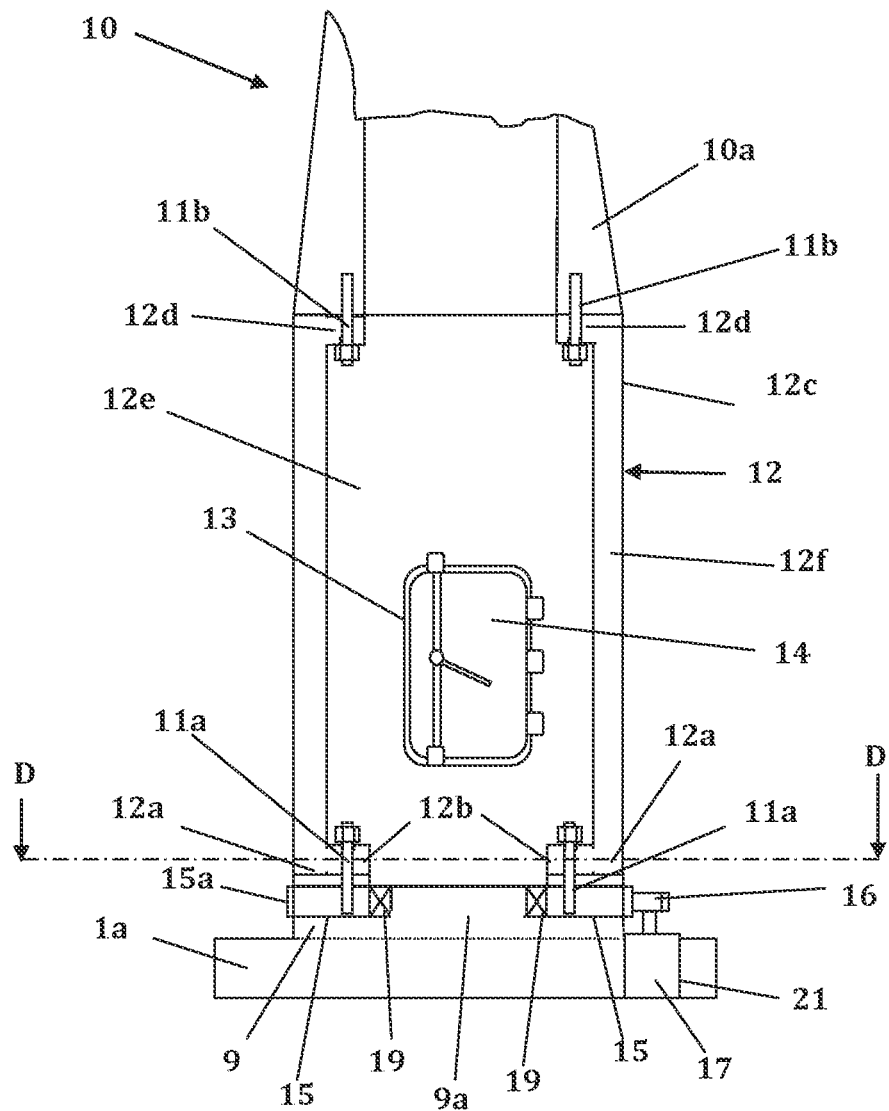
FIG. 6 is a partial cross section of a blade carrier structure and root extender-according to a third embodiment of the invention.
Figure 7:
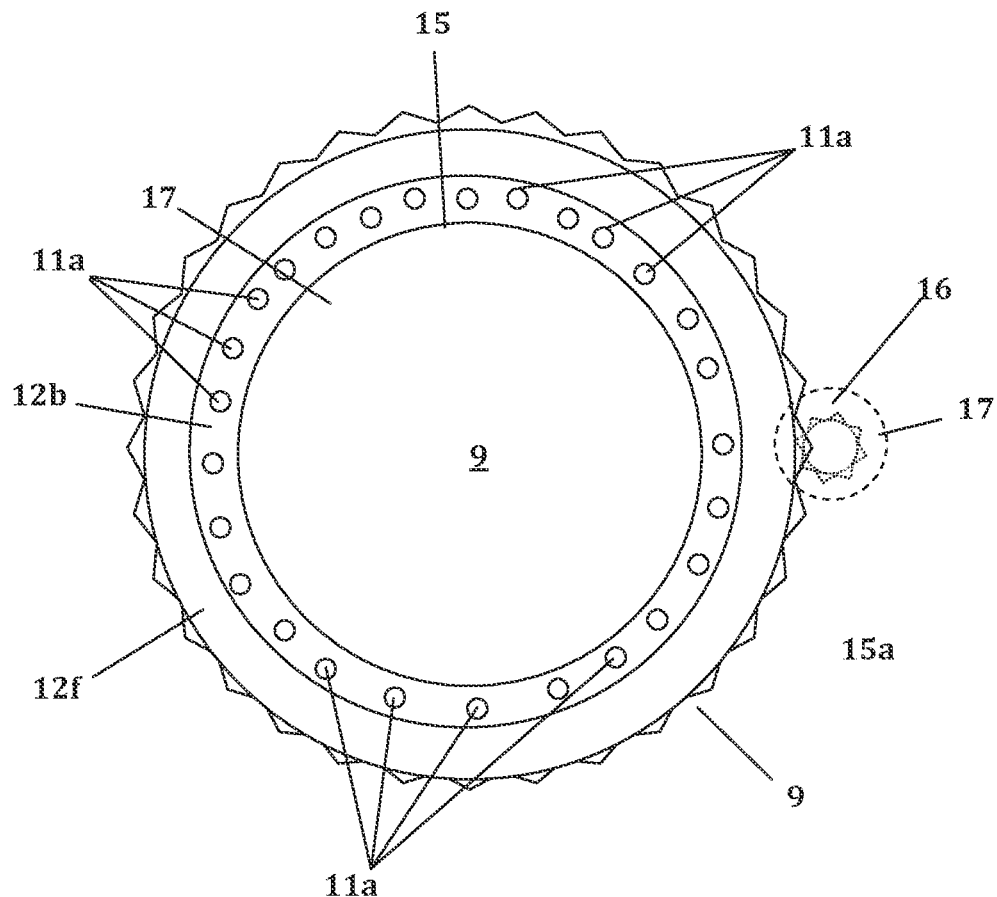
FIG. 7 is a cross section along line D-D marked in FIG. 6.

In the third embodiment illustrated in FIGS. 6 and 7, each blade pitch angle adjustment mechanism comprises a ring element -15- mounted in a gyratory manner at the central part -9a- of the blade carrier structure -9- through bearings -19-. The root extender -12- is securely mounted on the ring element -15- through proximal bolts -11a- extending through a proximal flange -12b- on the proximal end part -12a- of the root extender -12- so that the root extender -12- and blade -10- turn together with the gyratory ring element -15-. The distal end part -12b- of the root extender -12- is mounted on the blade root -10a- as illustrated in FIGS. 1 through 3. Thus, the proximal bolts -11a- and distal bolts -11b- are housed and accessible from the inner chamber -12e- of the root extender -12-.

The ring element -15- comprises an outer notched part -15a-, which is part of an outer peripheral edge of the gyratory ring element -15- located underneath the proximal edge part -12a- of the root extender -12-. The gyratory ring element -15- is driven by a propeller pinion -16- of an electric gear motor -17- that is fastened to the external annular body -1a- outside the root extender -12-.

Figure 8:
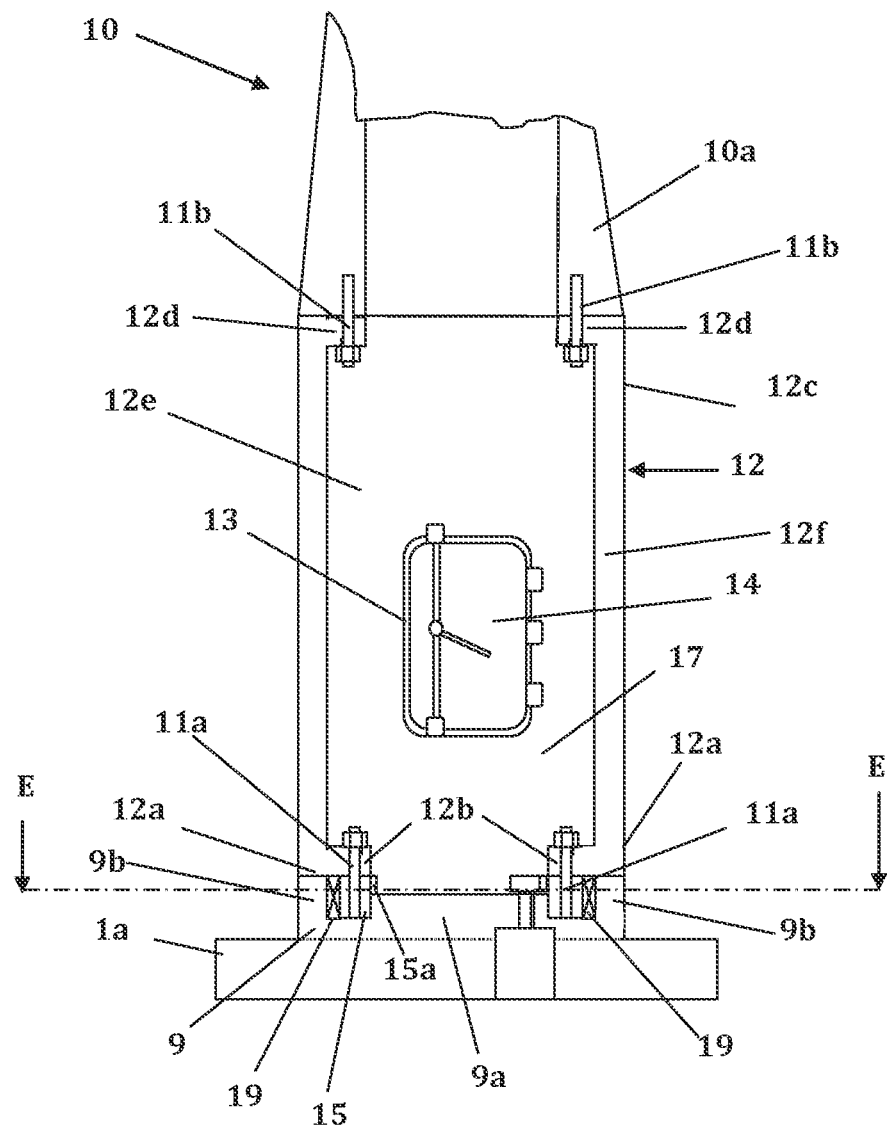
FIG. 8 is a partial cross section of a blade carrier structure and root extender according to a fourth embodiment of the invention.
Figure 9:
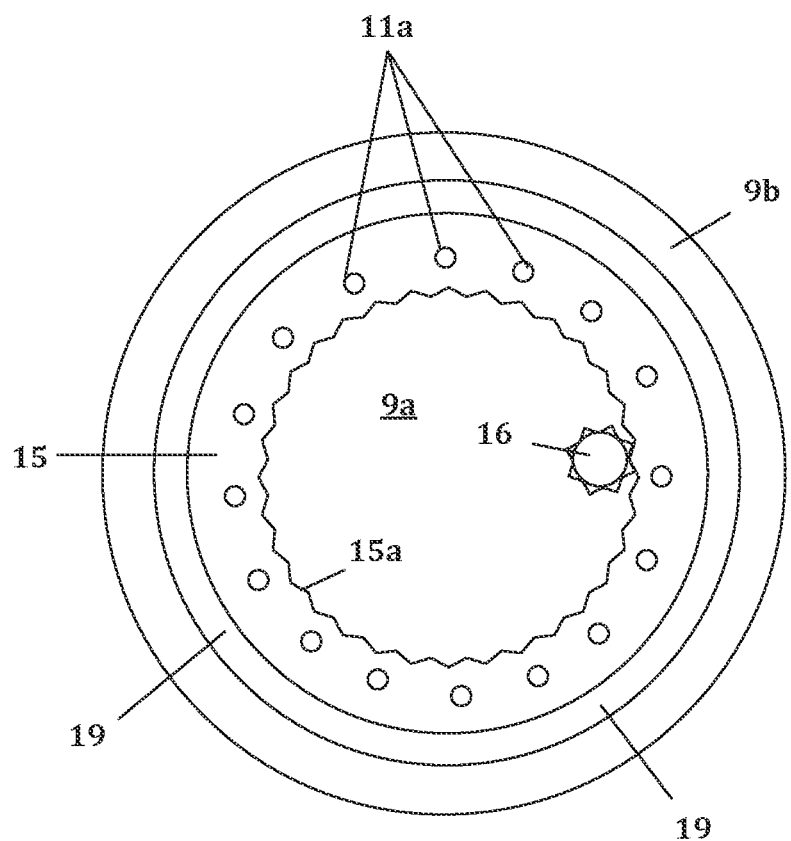
FIG. 9 is a cross section along line E-E marked in FIG. 8.

In the fourth embodiment illustrated in FIGS. 8 and 9, each blade pitch angle adjustment mechanism comprises a ring element -15- mounted in a gyratory manner at the central part -9a- of the blade carrier structure -9- through bearings -19-. The root extender -12- is securely mounted on the ring element -15- through proximal bolts -11a- extending through a proximal flange -12b- on the proximal end part -12a- of the root extender -12- so that the root extender -12- and blade -10- turn together with the gyratory ring element -15-. The distal end part -12b- of the root extender -12- is mounted on the blade root -10a- in the same manner as illustrated in FIGS. 1 through 3.

The root extender -12- is securely mounted on the ring element -15- through proximal bolts -11a- extending through a proximal flange -12b- on the proximal end part -12a- of the root extender -12- so that the root extender -12- and blade -10- turn together with the gyratory ring element -15-. The distal end part -12b- of the root extender -12- is mounted on the blade root -10a- in the same manner as illustrated in FIGS. 1 through 3.

The gyratory ring element -15- comprises an internal notched part -15a-, which is a constituent of the inner peripheral edge of the gyratory ring element -15- driven by the propeller pinion -16- of an electric gear motor -17- that is mounted at least partially in a stationary manner at a gap on this central part of the blade carrier structure -9-. Thus, the proximal bolts -11a-, distal bolts -11b-, the notched edge part -15a-, propeller pinion -16- and the electric gear motor -17- are housed and accessible from the inner chamber -12e- of the root extender -12-.

Figure 10:
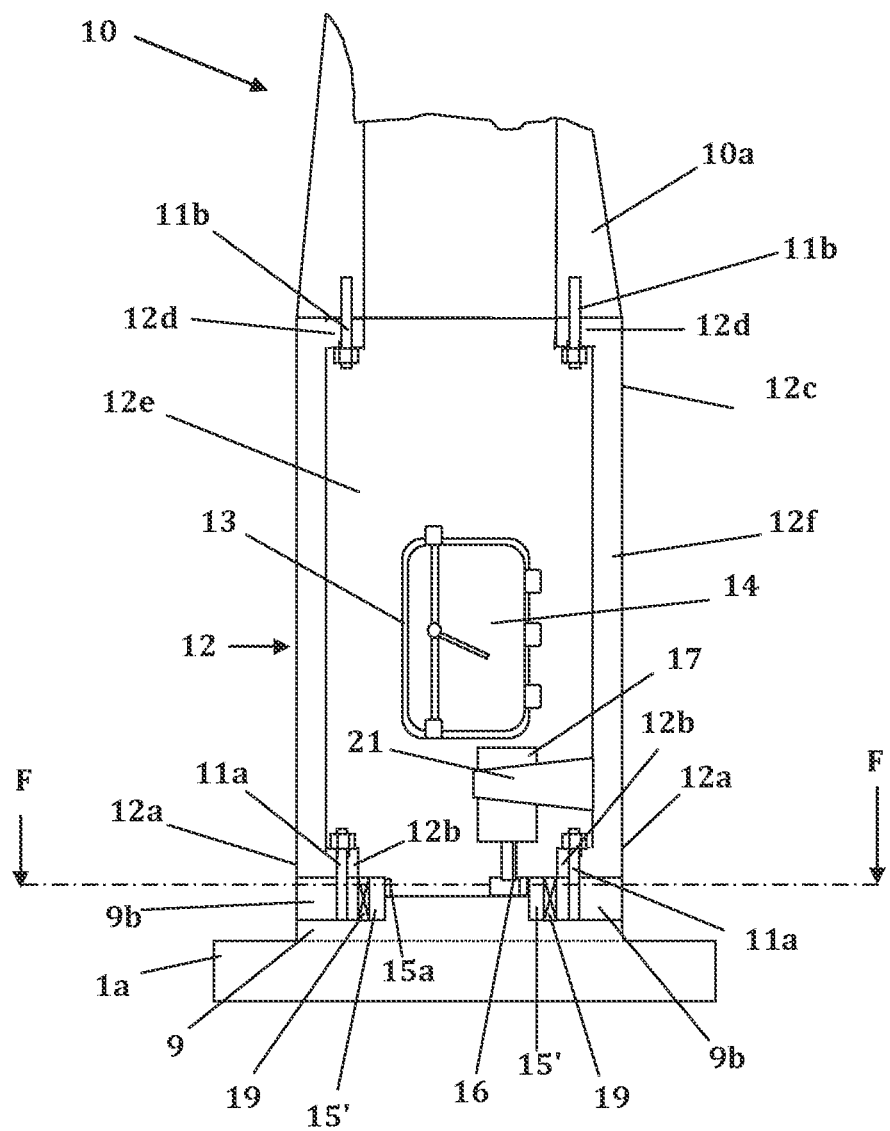
FIG. 10 is a partial cross section of a blade carrier structure and root extender-according to a fifth embodiment of the invention.
Figure 11:
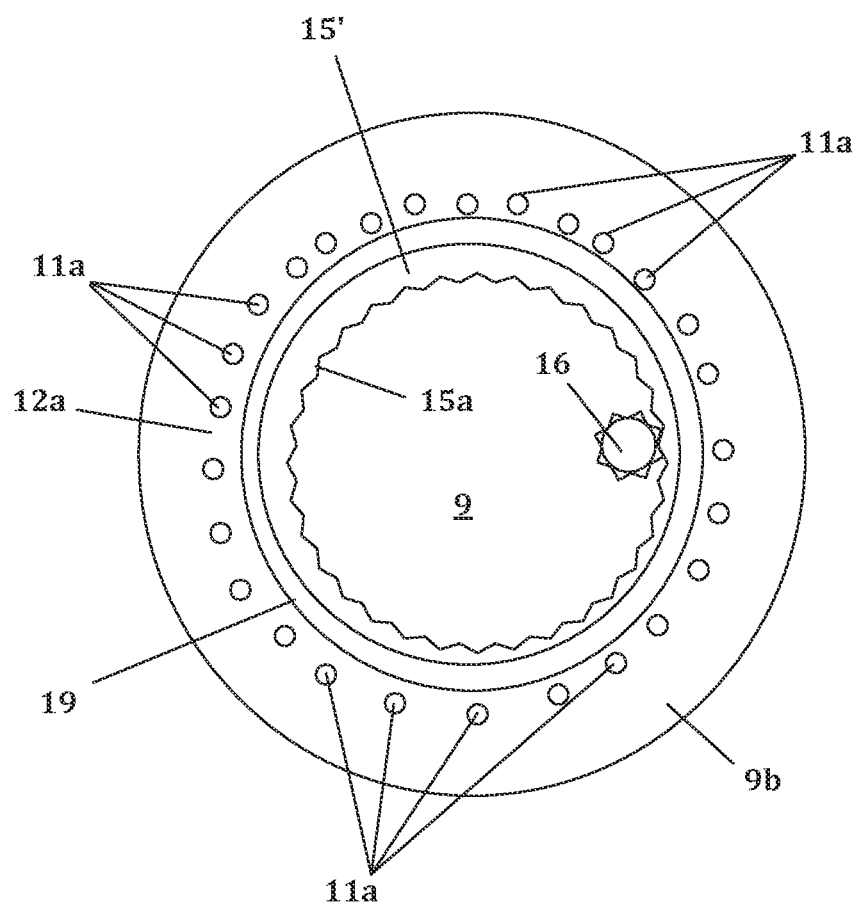
FIG. 11 is a cross section along line F-F marked in FIG. 10.

In the fifth embodiment illustrated in FIGS. 10 and 11, the distal end part -12b- of the root extender -12- is also mounted on the blade root -10a- as illustrated in FIGS. 1 through 3. A blade pitch angle adjustment mechanism for turning each blade is envisioned. The proximal mechanism for adjusting the blade pitch angle comprises a stationary ring element -15'- mounted in a stationary manner on the blade carrier structure -9- through fastening bolts (not shown) or otherwise, and a propeller pinion -16- driven by an electric gear motor -17- that engages an annular notched part -15a- inside the ring element -15- that is stationary -15'-. The electric gear motor -17- is mounted in a stationary manner next to the blade carrier structure -9- onto an inner part of the wall inside the inner chamber -12e- of the root extender -12-. The proximal end part -12a- of the root extender -12- is mounted on a peripheral support part -9b-, which is mounted in a gyratory manner on the blade carrier structure -9- through proximal bolts -11a- that extend through an internal proximal flange -12b- on the root extender -12- into the peripheral support part -9b-. Thus, the proximal bolts -11a-, distal bolts -11b-, the notched edge part -15a-, propeller pinion -16- and the electric gear motor -17- are housed and accessible from the inner chamber -12e- of the root extender -12-.

According to this fifth embodiment, the rotation of the propeller pinion -16- causes the electric gear motor -17- to travel along the annular notched part -15a- inside the stationary ring element -15-. Given that the electric gear motor -17- is attached to the inner part of the root extender wall -12-, it forces the root extender -12- to move with the electric gear motor -17- and, consequently, turn with respect of the blade carrier structure -9-.

In the sixth embodiment illustrated in FIGS. 12 and 13, the proximal end part -12a- of the root extender -12- is mounted on the blade carrier structure -9- as illustrated in FIGS. 1 through 3. Mounted in a gyratory manner on the distal end part -12b- at the root, extender -12-, there is a blade pitch angle adjustment mechanism for each blade, comprising a gyratory ring element -15-. The distal mechanism for adjusting the blade pitch angle includes at least one propeller pinion -16- that engages an annular notched part -15a- inside the gyratory ring element -15-. The propeller pinion -16- is driven by an electric gear motor -17- mounted in a stationary manner on an inner distal part of the wall inside the inner chamber -12e- of the root extender -12-. The blade root -10a- is fastened to the gyratory ring element -15- so that the rotation of the propeller pinion -16- causes the gyratory ring element -15- in addition to the blade root -10a- and blade -10- secured thereto to rotate. As illustrated, the proximal bolts -11a-, distal bolts -11b-, the notched edge part -15a-, propeller pinion -16- and the electric gear motor -17- are housed and accessible from the inner chamber -12e- of the root extender.

The invention claimed is:

1. A direct drive wind turbine comprising a generator equipped with an external rotor (1) that has an external annular body (1a) and internal stator (3); a horizontal shaft (5) connected to the external rotor (1) so that the external rotor (1) turns around the internal stator (3); a nacelle (6) mounted on an upper part of a tower (7) and housing a shaft carrier mechanism (8) to support the horizontal shaft (5); and numerous blade carrier structures (9) evenly arranged on the different outer peripheral parts of the external rotor body (1a), and each blade carrier structure (9) connected to a blade root (10a) of a turbine blade (10);

characterized by
each blade root (10a) is connected to the blade carrier structure (9) on the external annular body (1) through a hollow root extender (12);
the blade root extender (12) comprises a proximal end part (12a) connected to the blade carrier structure (9) through proximal bolts (11a), and a distal end part (12c) connected to the blade root (10a), an inner chamber (12e) encompassed by a peripheral wall (12f), a lateral manhole (13) on the peripheral wall (12f) for gaining access to the inner chamber (12e) and a door (14) to close the manhole (13).

2. A direct drive wind turbine according to claim 1, characterized by the external rotor (1) comprises a plurality of permanent magnets (2) attached internally to the external annular body (1a) and an internal stator (3) that comprises inductor windings (4).

3. A direct drive wind turbine according to claim 1, characterized by the distal end part (12c) is securely connected to the blade root (10a).

4. A direct drive wind turbine according to claim 3, characterized by the distal end part (12c) of the root extender (12) is connected to the blade root (10a) through distal axial bolts (11b, 11c) extending through an internal distal flange (12d) inside the root extender (12) and penetrating into a peripheral wall of the blade root (10a).

5. A direct drive wind turbine according to claim 3, characterized by each blade carrier structure (9) comprises a blade pitch angle adjustment mechanism for turning the blade (10) that consists of a gyratory ring element (15) mounted on the proximal end part (12a) of the root extender (12) and at least one propeller pinion (16) that engages an annular notched part (15a) on the gyratory ring element (15); and the propeller pinion (16) is driven by an electric gear motor (17).

6. A direct drive wind turbine according to claim 5, characterized by the gyratory ring element (15) rotates around a central part (9a) of the blade carrier structure (9).

7. A direct drive wind turbine according to claim 6, characterized by the cited notched part (15a) is a constituent of the outer peripheral edge of the gyratory ring element (15) arranged underneath the proximal end part (12a) of the root extender (12), and each electric gear motor is attached to the external annular body (1a) outside the root extender (12).

8. A direct drive wind turbine according to claim 6, characterized by
the cited notched part (15a) is a constituent of the inner peripheral edge of the gyratory ring element (15);
the proximal end part (12a) of the root extender (12) encompasses the cited notched part (15a) and each propeller pinion (16);
each electric gear motor (17) is mounted in a stationary manner on the cited central part (9a) of the blade carrier structure (9) so that the gyratory ring element (15) rotates on this blade carrier structure (9).

9. A direct drive wind turbine according to claim 8, characterized by each electrical gear motor (17) is mounted in a stationary manner onto the cited central part (9a) of the blade carrier structure (9) through a motor support (21) so that the gear motor (17) is located inside the inner chamber (12e) of the root extender (12).

10. A direct drive wind turbine according to claim 8, characterized by each electric gear motor (17) is mounted at least partially in a stationary manner at a gap on this central part (9a) of the blade support (9).

11. A direct drive wind turbine according to claim 5, characterized by the proximal end part (12a) of the root extender (12) is connected to the gyratory ring element (15) through proximal bolts (11a) extending through a proximal flange (12b) inside the root extender (12) into the gyratory ring element (15).

12. A direct drive wind turbine according to claim 3, characterized by
each blade carrier structure (9) comprises a blade pitch angle adjustment mechanism to turn the blade (10) that consists of a stationary ring element (15') mounted in a stationary manner onto the blade carrier structure (9);
at least one propeller pinion (16) that engages the stationary ring element (15'), and the propeller pinion (16) is driven by an electric gear motor (17);
the proximal end part (12a) of the root extender (12) is mounted on a part of the peripheral support (9b) that is mounted in a gyratory manner onto a blade carrier structure (9);
each electric gear motor is mounted in a stationary manner next to the blade carrier structure (9) onto an inner part of the wall inside the inner chamber (12e) of the root extender (12).

13. A direct drive wind turbine according to claim 1, characterized by the proximal end part (12a) of the root extender (12) is securely connected to the blade carrier structure (9).

14. A direct drive wind turbine according to claim 13, characterized by each proximal end part (12a) of the root extender (12) is securely connected to the blade carrier structure (9) through a plurality of proximal axial bolts (11a) extending from an internal proximal flange (12b) inside the root extender (12) into the blade carrier structure (9).

15. A direct drive wind turbine according to claim 13, characterized by
- a blade pitch angle adjustment mechanism for turning each blade (10) that consists of a gyratory ring element (15) mounted in a gyratory manner onto the distal end part (12b) of the root extender (12) and at least one propeller pinion (16) that engages an annular notched part (15a) inside the gyratory ring element (15), and the propeller pinion (16) is driven by an electric gear motor (17);
- the electric gear motor (17) is mounted in a stationary manner onto an inner distal part of the wall inside the inner chamber (12e) of the root extender (12);
- the blade root (10a) is fastened to the gyratory ring element (15).

\* \* \* \* \*